April 14, 1964    R. W. JOHNSON ETAL    3,128,833
PLANTING AND CULTIVATING DEVICE
Filed Jan. 15, 1962    3 Sheets-Sheet 1
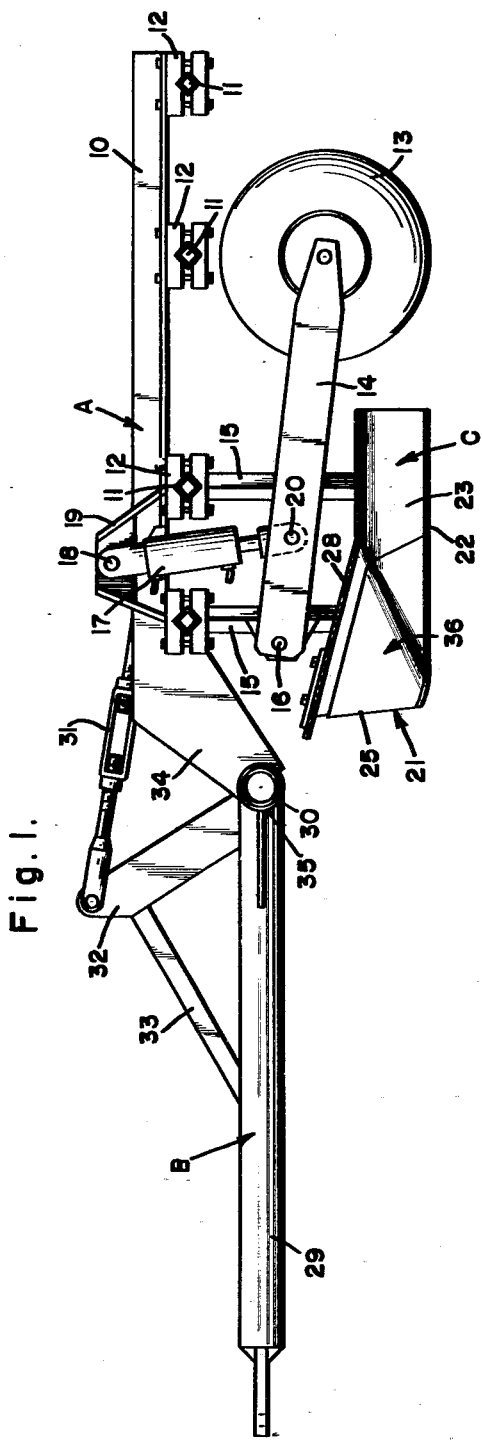
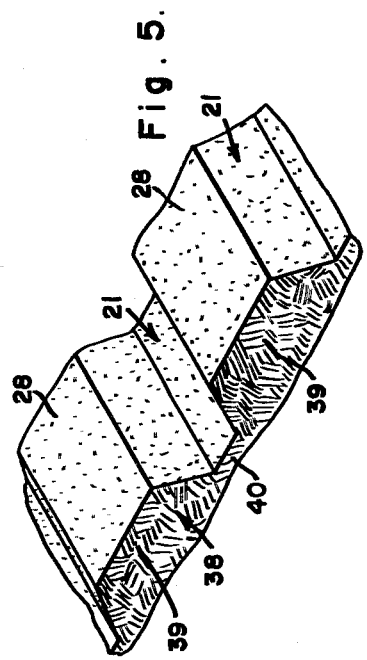
INVENTORS
Roy W. Johnson
BY Bernell H. Johnson
Townsend and Townsend
attorneys INVENTORS
Roy W. Johnson
Bernell H. Johnson April 14, 1964  R. W. JOHNSON ETAL  3,128,833
PLANTING AND CULTIVATING DEVICE
Filed Jan. 15, 1962  3 Sheets-Sheet 3

INVENTORS
Roy W. Johnson
Bernell H. Johnson
BY
Townsend and Townsend
attorneys

United States Patent Office 3,128,833
Patented Apr. 14, 1964

3,128,833
PLANTING AND CULTIVATING DEVICE
Roy W. Johnson and Bernell H. Johnson, Davis, Calif., assignors to Johnson Farm Machinery Co., Davis, Calif.
Filed Jan. 15, 1962, Ser. No. 166,229
8 Claims. (Cl. 172—245)

This invention relates to farm equipment. More particularly, it relates to a sled for shaping and planting seed beds for row crops and which may be converted for cultivating and otherwise treating the planted beds.

In a preferred embodiment, the gist of the invention lies in the provision of a plurality of parallel pontoons for supporting the sled frame or body. The pontoons are intended to ride in the furrows of a tilled field. They have a configuration which tends to follow the furrow contour and shapes the sides thereof where necessary.

Simultaneously, the top of the bed is smoothed and flattened by a cover plate spanning two adjacent pontoons and which is removably attached thereto. In other words, the seed bed is formed between two pontoons and under the cover plate. Suitably, the seed planter appropriately supported on the frame behind the pontoons plants seeds in the newly formed beds in conventional manner.

Later, when it is desired to cultivate or weed the planted and growing beds, it may be accomplished simply by removing the cover plates, attaching suitable tools to depend from the frame of the sled, and propelling the frame over the field with the pontoons riding in the furrows previously shaped and formed by them. Since the furrows have been formed by the pontoons, the pontoons ride smoothly and in an exceedingly stable manner down the furrows. There is no room for weaving and it is a relatively simple matter for even an inexperienced operator to cultivate closely to the growing plants without damaging them.

Prior devices for bed forming and planting and for cultivating employed essentially two separate units for the combined operations. Previously, a bed shaper in the form of a separate integral unit was employed for shaping and forming the seed beds and contiguous furrows. These bed shapers were then removed from the sled in their entirety after planting was accomplished. In order to cultivate, separate and independent furrow guiding equipment was installed to guide the machine through the furrows.

Aside from the sime and effort required to remove entire assemblies and replace the removed assemblies with the desired appendages, the most serious drawback of this prior machinery was the fact that the furrow guidance device used for the cultivation operation was different than the furrow guides and shapers used initially. Consequently, the sled would not follow exactly the path during cultivation that it had followed during the forming and planting operation. Experienced operators were essential for precision work and they were limited in how fast they could travel. Even with an experienced operator very close cultivation in the area of the growing plant was too dangerous to attempt.

The principal object of the present invention, therefore, is to provide a convertible device which may be used for both bed shaping and forming along with planting and which is later usable for cultivation. A more specific object is to provide such a convertible device which provides the same guidance mechanism for contacting the furrow during all of the aforementioned operations.

A device embodying the foregoing object has the advantages of great stability during movement over a tilled or furrowed field, makes close cultivation a simple reality, and is capable of being moved at relatively rapid rates. During cultivation, for example, there is little fear that the device will not follow the desired route.

A further advantage lies in the ability to operate the device with relatively inexperienced personnel since guidance during close cultivation is easily obtained. A further advantage lies in the ease with which the device may be converted from bed forming and planting to cultivation. In contrast with prior devices requiring major part removal and replacement, the present device is converted simply by removing the cover plates.

Other more specific objects of the present invention include the provision of a device that is adjustable for any bed width desired. Another specific object is to provide a convertible bed shaping and cultivating sled which provide means for positioning the furrow guidance mechanism and conventional cultivating and planting tools and the like in a plurality of positions with respect to the longitudinal axis, i.e. the direction of movement, of the sled.

These and other objects have now been achieved by the device of the present invention which generally comprises a sled having a frame adapted for movement over an agricultural field, at least two bed shaper-furrow guides, means for depending said guides from said frame at selected one of a plurality of positions in substantially parallel alignment, and at least one removable bed cover adapted for attachment to two adjacent guides to overlay the ground therebetween whereby the sled may be used for shaping beds and planting seeds therein with said cover affixed to said guides, and the sled thereafter be used for cultivating the same beds by removing the cover plates and depending appropriate tools from the frame.

The configuration of the bed shaper-furrow guides themselves contribute greatly to the success of the present device. Each bed shaper-furrow guide comprises generally a pontoon having a flat bottom and two upwardly and outwardly extending sides converging to form a prow at one end thereof. This pontoon configuration provides unusual stability of the sled during use. This construction has been found to be unusually advantageous since the pontoon thereby has the capability of following throughout the length of the furrow without weaving or changing positions in unexpected and undesirable manners. The above noted configuration of the pontoon enables it to follow the contour and stay in the desired position in the furrow without the necessity of being specifically guided by the operator of the sled.

In the accompanying drawings there is shown in:

FIG. 1 a side sectional view of the device provided by the present invention.

FIG. 5 shows in the perspective a portion of the pontoons and cover plates provided by the present invention and their relationship to the seed beds and furrows when the sled is in use.

Figure 2:
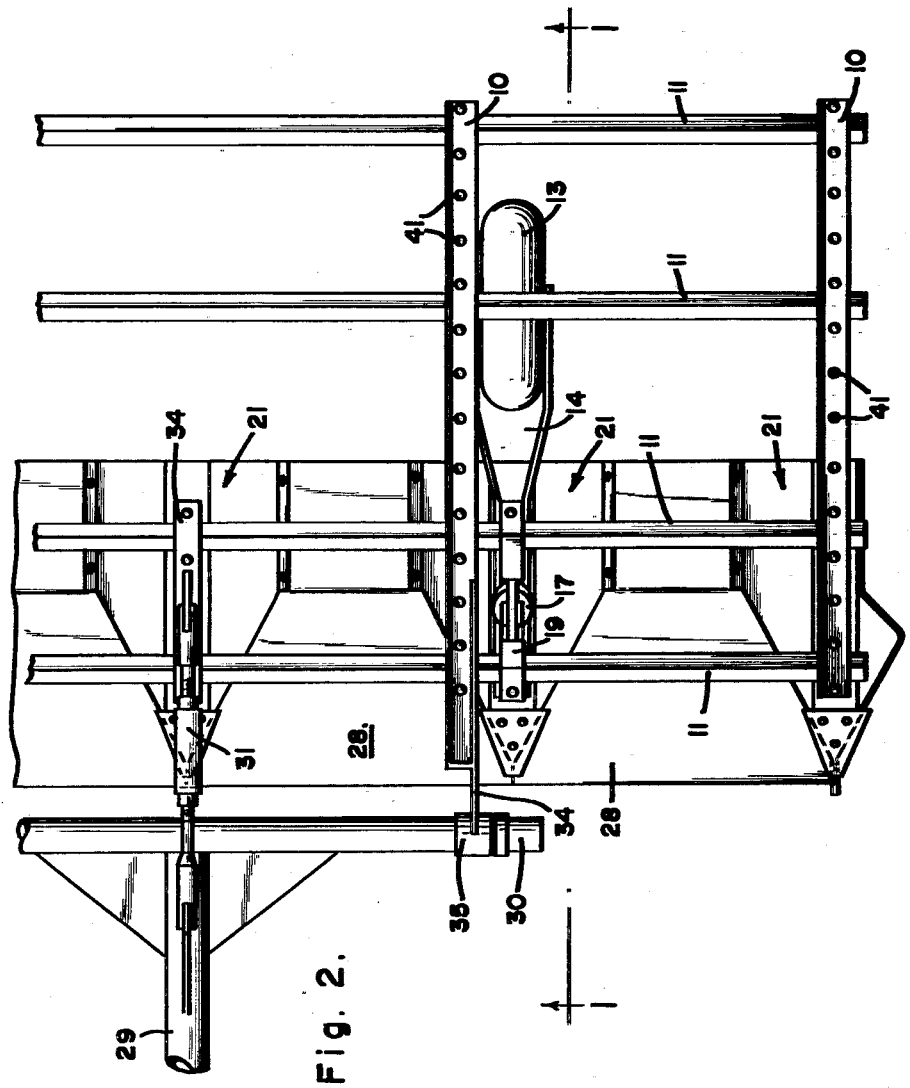
FIG. 2 shows in a top view a portion of the sled embodying the present invention. The sectional view of FIG. 1 is taken along the line 1—1 of FIG. 2.
Figure 3:
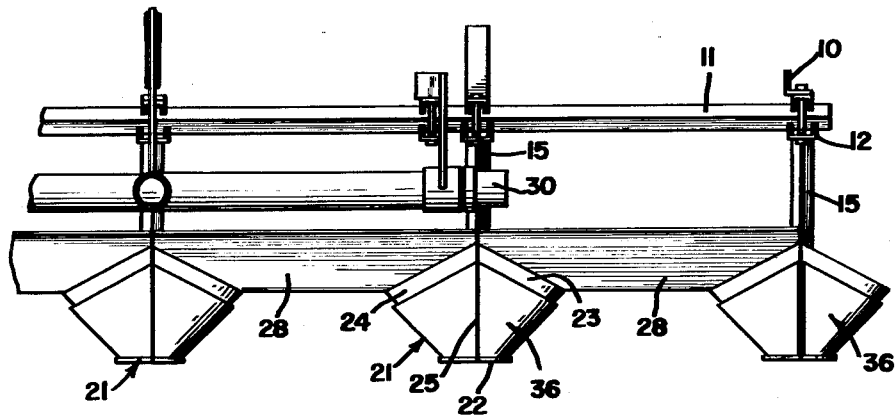
FIG. 3 shows in front elevation a portion of the sled provided by the present invention corresponding generally to that shown in FIG. 2 and particularly illustrating the relationship of the pontoons and cover plates to the sled frame.

As will be seen most clearly in FIG. 1, the preferred embodiment of the present invention is composed generally of three main elements including a main body A for supporting the operational components of the device, propulsion means B which here takes the form of a draw tongue suitable for attachment to a tractor but might equally well be a self-contained motor or the like, and land contacting and manipulating components shown generally at C.

More specifically, the main body A includes a plurality of longitudinal channel members 10. A plurality of transverse tool bars 11 are attached to channels 10 by tool bar clamps 12. Frame or body A is supported for movement, particularly when not in farming use, on a pair of wheels 13 (one wheel is not shown but is similarly mounted and supported) by a brace 14. Brace 14 is pivotally mounted on a tool bar standard 15 at 16. Wheel 13 and brace 14 may be pivoted up and down for engagement and disengagement with the ground by means of ram 17 pivotally mounted at 18 through bracket 19 to frame A at one end of ram 17 and pivotally attached at 20 to brace 14.

Earth contacting and manipulating tools C comprise a plurality of pontoons each shown generally at 21. Each pontoon 21 includes a flat bottom 22 and a pair of upwardly and outwardly extending sides 23, 24 which converge at one end to form a prow at 25. The other end of sides 23, 24 opposite from prow 25 is open. Suitable braces 26, 27 contribute to the structural rigidity of pontoons 21.

Pontoons 21 are depended from tool bars 11 by tool bar standards 15 and are arranged in substantially parallel alignment. A plurality of cover places 28 are removably attached with bolts, for example, to mutually facing sides of adjacent pontoons 21.

As illustrated the unit is adapted to be moved over a field by means of draw tongue 29 and draw bar 30. Suitably, tongue 29 is attached to a tractor. Turn buckle 31 is pivotally mounted on tongue 29 and bar 30 by means of braces 32, 33. At the other end, turn buckle 31 is pivotally attached to plate 34 which is in turn fixed to tool bars 11. Rotation of turn buckle 31 causes frame A to be raised or lowered depending on the direction of rotation.

Frame A is joined to draw bar 30 by means of connector plates 34 and sleeves 35, connector plate 34 being fixed to channel member 10 and sleeve 35 being rotatably and concentrically placed over draw bar 30. Consequently, when turn buckle 31 is extended, frame A is caused to move upwardly as it rotates about draw bar 30 on sleeve 35. When turn buckle 31 is contracted, frame A reverses its direction and moves downwardly. As frame A is moved, pontoons 21 follow accordingly since they are connected to frame A through tool bar standard 15. This permits selection of any desired angle of inclination of pontoons 21 with respect to the ground. The reasons for this will be noted hereinafter.

Pontoons 21 also may include a wear plate shown generally at 36. Wear plates 36 conform to the contour of pontoons 21 and generally cover the leading edges and surfaces of sides 23, 24 of pontoons 21 in the vicinity of prows 25 and substantially all of the bottoms 22 of pontoons 21. Wear plate 36 is optionally employed in order to protect pontoons 21 from being worn and damaged during use. Since wear plates 36 are smaller and more simply constructed, they may be more inexpensively replaced than if the entire pontoon 21 were permitted to wear out and require replacement.

Figure 4:
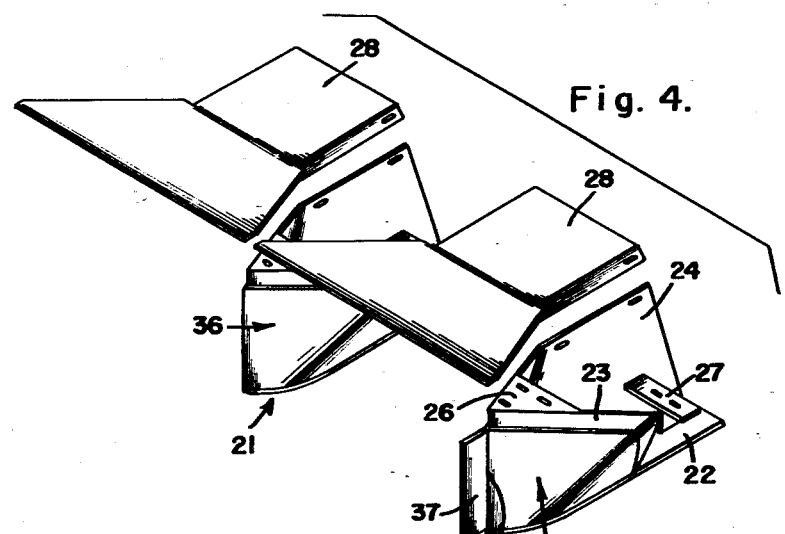
FIG. 4 shows an exploded perspective view of two adjacent pontoons and associated cover plates.

As seen most clearly in FIG. 4, the outer sides 23 of the two end pontoons, when a plurality of pontoons are depended from frame 10, are abbreviated. In addition, a fin 37 is attached to wear plate 36 (or to pontoon 21 if a wear plate is not employed) and extends longitudinally forwardly from prow 25 of each of the two end pontoons 21. By abbreviating side 23 and including fin 37, earth is prevented from being thrown outwardly on to adjacent beds which may already have been planted and formed.

In use, the entire unit is drawn across the area which is to be planted and cultivated. It is alternatively possible to pre-form furrows and beds in any of the ways known in the art with a separate device, or the present unit itself may be used to form beds and furrows in the farm land. If the latter alternative is selected and the ground is particularly hard, it may be necessary to precede pontoons 21 with means for breaking and disintegrating the ground or for forming the furrows themselves. Thus, for example, a lister bar or furrow shovel may be depended from frame 10 forwardly of pontoons 21 utilizing an available tool bar 11. If the ground is sufficiently soft, pontoons 21 with cover plates 28 affixed thereto may be used to actually form the furrows and bed.

FIG. 5 in particular illustrates the position of the pontoon 21 and cover plates 28 as they appear when passed over earth 38 forming alternate beds 39 and furrows 40. FIG. 5 illustrates how pontoons 21 ride in forming and shaping furrow 40 and cover plate 28 smooths and packs the surface of bed 39. The degree of packing and the height of bed 39 is controlled by means of turn buckle 31. By rotating turn buckle 31 so that pontoons 21 and cover plates 28 are inclined so that their leading edges are relatively level, very little earth will be carried along by the device. By adjusting turn buckle 31 so that the leading edges of pontoons 21 and cover plates 28 are pointed upwardly, varying conditions of the bed surfaces may be obtained.

It is to be noted that the present device is particularly advantageous in that it may be employed for forming beds of any desired width. As shown most clearly in FIG. 2, pontoons 21 depending from tool bar standards 15 may be moved closer or further apart as desired simply by sliding tool bar clamps 12 along tool bars 11 to the desired position that will form the appropriate bed width. It is then only necessary to employ a cover plate 28 having a width equal to the distance between adjacent pontoons.

The adjustability of the device does not cease in the area of bed width selection. In addition, as shown most clearly in FIG. 2, channels 10 define a plurality of closely spaced holes 41 therein. Consequently, tool bars 11 with bar clamps 12 may be placed at any desired longitudinal position along channels 10. In this way various positions of the pontoons and/or positions of other tools which are depended from tool bar 11 may be selected. In this regard it should be noted that while all pontoons 21 are aligned in a substantially parallel arrangement, they need not fall in a common transverse plane but may be staggered with pairs of pontoons at the forward part of frame A and other pairs at other more rearward positions. Such a staggering of the pontoons enhances the overall stability of the sled.

After the furrows 40 and beds 39 have been shaped and formed, seeds may be planted therein by depending conventional seed planters from tool bars 11 which are positioned on channels 10 rearwardly of the pontoons 21. Thus the beds are shaped, formed, and planted on one trip through the field with the present device.

After planting, and when it is desired to cultivate the field, cover plates 28 are removed by unbolting them from sides 23, 24 of pontoons 21 and the pontoons are propelled through the same furrows 40 that they have previously formed. At the same time, suitable cultivating tools well known in the art such as sweeps, shank cultivators, spring coil cultivators, discs and the like are depended from tool bars 11 in conventional manner and moved across beds 39 as the pontoons and sled are propelled through the field. As previously noted, since the pontoons are again traveling through the same furrow that they have previously formed, extremely close cultivation may be accomplished.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. In a planting and cultivating sled for use with row crops, the combination including a plurality of bed shaper-furrow guides in substantially parallel alignment, each guide comprising:
   (a) a pontoon having a flat bottom;
   (b) and two upwardly and outwardly extending sides converging to form a prow at one end thereof;
   (c) the outer side of each of the two outer pontoons being abbreviated adjacent to the prow of the pontoon, said two outer pontoons each having a longitudinal fin projecting outwardly from the prow thereof whereby earth is prevented from being thrown outwardly onto adjacent seed beds.

2. A convertible planting and cultivating sled for use with row crops comprising:
   (a) a horizontal frame;
   (b) a draw bar and tongue projecting forwardly from said frame for attachment to transportation means;
   (c) a turn buckle cooperating with said draw bar and tongue and frame for positioning said frame at a preselected inclination with respect to the surface of the ground;
   (d) a plurality of transverse tool bars supported by said frame at selected ones of a plurality of positions;
   (e) a plurality of bed shaper-furrow guides depended from said tool bars at selected ones of a plurality of positions in substantially parallel alignment;
   (f) each of said guides comprising a flat bottomed pontoon having two upwardly and outwardly extending sides which converge to form a prow at the front end thereof;
   (g) the outer sides of the two outer pontoons being abbreviated adjacent to the prow formed thereby;
   (h) a wear plate for each of said pontoons removably attached to the leading portions of the sides and substantially all of the bottom of each of said pontoons;
   (i) a plurality of removable cover plates attached to mutually facing sides of adjacent pontoons to overlay the ground therebetween;
   (j) whereby the sled may be used for shaping beds and planting seeds therein with said cover affixed to said guides and the sled may thereafter be used for cultivating the same beds by removing the bed cover and depending appropriate tools from the frame.

3. A seed bed shaping device comprising a mobile frame, at least two furrow forming devices attached to said frame at laterally spaced points, and bed forming means removably attached to adjacent portions of said furrow forming devices.

4. A convertible seed bed shaping device comprising a mobile frame, at least two furrow forming pontoons supported by said frame in substantially parallel alignment at laterally spaced points, and a bed forming cover plate removably attached to adjacent portions of said furrow forming pontoons so as to overlie the ground therebetween.

5. A seed bed shaping device in accordance with claim 4 wherein each of said pontoons includes a bottom and two upwardly and outwardly disposed sides attached to said bottom, said sides converging to form a prow at the forward end of said pontoon.

6. A seed bed shaping device in accordance with claim 4 wherein each of said furrow forming pontoons includes a flat bottom and two upwardly and outwardly disposed flat sides attached to said bottom, said flat sides converging to form a prow at the forward end of the pontoon, and said cover plate is attached to the mutually facing sides of adjacent pontoons.

7. A seed bed shaping device in accordance with claim 4 wherein each of said furrow forming pontoons includes a flat bottom and two upwardly and outwardly disposed flat sides attached to said bottom, said flat sides converging to form a prow at the forward end of the pontoon, the outer sides of the outer pontoons supported by said frame being abbreviated adjacent to the prow formed thereby, each of said outer pontoons including a fin projecting longitudinally outwardly from the prow thereof.

8. A seed bed device in accordance with claim 4 and including a tool bar mounted on said frame.

References Cited in the file of this patent

UNITED STATES PATENTS

| | | |
|---|---|---|
| 1,204,890 | Logsdon | Nov. 14, 1916 |
| 2,948,543 | Collier | Aug. 9, 1960 |
| 2,975,842 | Mostrong | Mar. 21, 1961 |